Aug. 7, 1962 M. B. HASLAM ET AL 3,048,830

TAPE RECORDING SYSTEM AND METHOD

Filed March 28, 1960

*INVENTORS.*
MAURICE B. HASLAM.
*BY* OLIVER C. MILES.
Alden D. Redfield
Irwin P. Garfinkle
ATTORNEYS.

3,048,830
TAPE RECORDING SYSTEM AND METHOD

Maurice B. Haslam, Waltham, and Oliver C. Miles, Needham Heights, Mass., assignors to Avco Corporation, a corporation of Delaware Filed Mar. 28, 1960, Ser. No. 17,831
11 Claims. (Cl. 340—174.1)

Figures 1, 2:
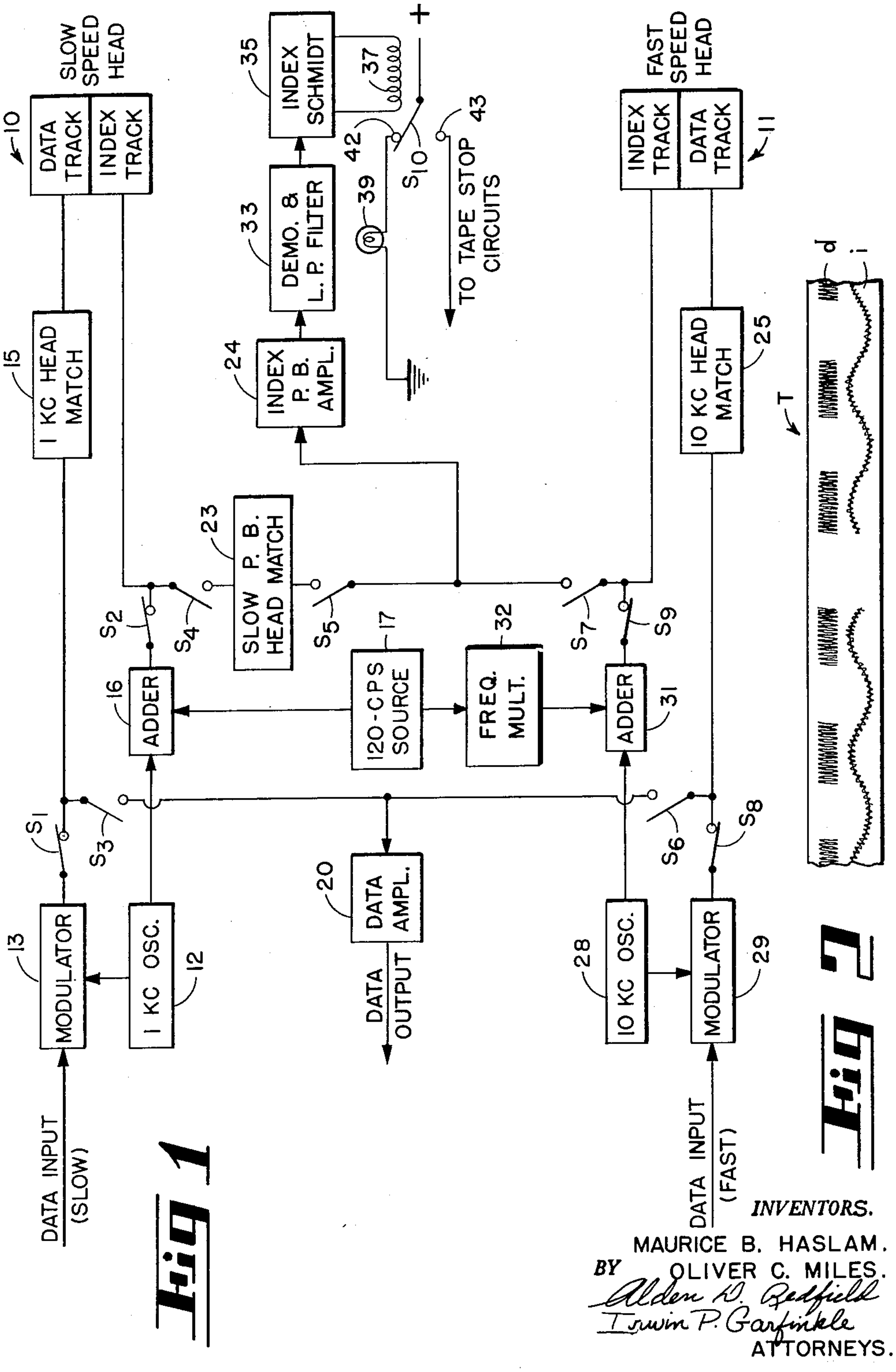

This invention relates to a system and method of recording data on a magnetic tape and for transmitting recorded data between two locations efficiently and economically.

Generally, this invention finds use in a data compressor-expander system, that is, a system in which data is recorded at a normal or slow speed on a magnetic tape and subsequently transmitted at a relatively high speed, thereby greatly reducing the time necessary for normal transmission and, hence, "compressing" the recorded data. Data received and recorded at high speed is then played back at slow or normal speed, thus "expanding" the data.

In such systems of communication, as well as in other types of data-handling systems, some means must be provided for indexing the data which is applied to the magnetic tape so that the beginning and end, as well as the intermediate portions of a message, may be readily identified during operation of the system. This invention utilizes a double track tape, the message or data being applied on one track and a continuous and coextensive alternating current indexing signal being applied on the second track. It will be recognized, however, that on play-back the index signal generated by the second track will vary in frequency, depending on whether the apparatus is operated at slow speed, fast speed, or rewind. In one embodiment of this invention as actually reduced to practice, the tape speed at different periods of operation varies from one inch per second to one hundred inches per second, depending upon the particular playback operation. This means that the frequency of an index signal originally applied at 1,000 cycles during a slow-record period will vary on playback at various speeds from 1,000 cycles to 100 kilocycles. As a practical matter, such signals could not be picked up over this entire range without the use of extremely expensive wideband circuitry requiring special and expensive components.

It is an object of this invention, therefore, to provide an indexing system for a magnetic tape which will be operable over a wide range of frequency without requiring complex wideband circuitry.

Another object of this invention is to apply first and second index signals to the index track of a magnetic tape, the two index signals being of different frequencies, the first being operable over one range of playback speeds and the second being operable over a second but overlapping range of playback speeds.

Another object of this invention is to simultaneously apply two index signals of different frequency to the index track of a magnetic tape, the index signals being co-extensive with the data signals which are applied to a data track.

For further objects and a more complete understanding of the nature of this invention, reference should now be made to the following description, together with the accompanying drawing, in which:

FIG. 1 is a block diagram illustrating the system and method of this invention; and FIG. 2 is a diagrammatic representation of the index and data signals applied to a magnetic tape.

The over-all system incorporates at least two tape recorders, each having apparatus for recording and for playing back at either a fast or a slow tape speed. In operation, a recorder at a first location slow records, that is, applies data to a magnetic tape at a slow speed. subsequently this data is played back at a fast speed and is transmitted by any suitable means such as, for example, telephone lines, to a second station which then operates to receive and record at the fast speed. Subsequently, the second station plays back at the original slow speed and, thus, the data is converted back to its original form but the time of transmission has been reduced by a factor which is the ratio of the slow tape speed to the fast tape speed.

In apparatus as actually reduced to practice, the data applied to the tape was in the form of a Baudot code taken from the output of a conventional teletypewriter, and the operating speeds for the tape were 1 inch per second and 10 inches per second for the slow and fast speeds, respectively. On rewind the maximum tape speed was 100 inches per second. For convenience of explanation, the invention as described in this specification incorporates the foregoing parameters; it is to be understood, however, that depending upon the particular system requirements, other forms of data such as, for example, speech, and other tape speeds may be employed. An over-all tape recording system describing apparatus for compressing and expanding data in the form of speech is described and illustrated in the Tannenbaum et al. application, Serial No. 692,960, now Patent No. 3,027,425, dated March 27, 1962, assigned to the same assignee as this invention.

Briefly described, this invention contemplates the use of a double-track magnetic tape, to each track of which is simultaneously applied index and data signals, respectively. The index signals are used for the purpose of stopping and starting the tape for predetermined operations and must be capable of detection during all periods of operation, including playback. In the described embodiment of the invention, as previously noted, first and second index signals are used having frequencies of 1,000 cycles and 120 cycles, respectively. Since, under the conditions described, the magnetic tape is designed for operation at speeds varying from 1 inch per second during a slow-speed operation to 10 inches per second during a fast-speed operation and up to 100 inches per second during rewind, it will be recognized that if only a single index signal were applied to the tape it would vary, depending on the particular operation, over a range of 100 to 1; and, thus, an index signal of 1,000 cycles applied at 1 inch per second will play back at 100,000 cycles during rewind.

In order to avoid the wideband requirements imposed by these variations in playback frequency, the two index signals are simultaneously applied to the index track, one superimposed upon the other, the second index signal being applied at a much lower frequency than the first. With first and second frequencies of 1,000 cycles and 120 cycles, respectively, the frequency of the first index signal will vary during playback from 1,000 to 100,000 cycles, while the frequency of the second indexing signal varies from 120 cycles to 12,000 cycles as the tape speed varies from 1 inch per second to 100 inches per second. This means that the playback apparatus of the tape recorder need only be designed to pick up index signals over a frequency range of 1,000 cycles per second (the low limit of the first frequency) and 12,000 cycles per second (the high limit of the second frequency).

Both indexing signals are applied co-extensively with the data signals, and the apparatus is designed for operation only in the presence of an index signal. In order to avoid the stopping of the apparatus during normal pause in the transmission of data signals, time delays are provided in the index system to ignore the absence of index for predetermined intervals. When these intervals are exceeded, then the absence of index signals serves to stop the apparatus.

Referring now to FIG. 1 of the drawing, there is diagrammatically illustrated a tape recorder having a slow-speed magnetic head 10 and a fast-speed magnetic head 11. It will be understood, of course, that the tape recorder will also have additional heads for erasing and other operations as may be required for the particular use of the equipment. Each magnetic head 10 or 11 is provided with a data track for recording and playing back data signals, and an index track for recording and playing back index signals.

For the slow-record operation, the switches $S_1$ and $S_2$ are closed while the remaining switches are open. In the system as reduced to practice, the output from a teletypewriter (not illustrated) is used to modulate the output of a 1 kc. oscillator 12 in a modulator 13. That is to say, the interrupted direct current output from the teletypewriter is used to produce interrupted oscillations in the output of modulator 13 which is then applied through a switch $S_1$ and 1 kc. impedance-matching circuit 15 to the data track of the slow-speed head 10. The interrupted oscillations on the data track of the tape T are diagrammatically represented in FIG. 2.

The output from the 1 kc. oscillator 12 also provides the first frequency for the indexing track of the slow-speed magnetic head 10, and this is combined in an adder 16 with the output of a 120-cycle oscillator 17, providing the second index frequency. The combined outputs are then applied to the index track of head 10 through the closed switch $S_2$ and are represented in FIG. 2 at the portion *i* of tape T. It will be noted that the outputs of the 1 kc. oscillator 12 and the 120-cycle oscillator 17 are simply added so that the output of the adder 16 is effectively a 1 kc. oscillation on which the 120-cycle per second frequency has been superimposed.

At this point then, data signals and index signals at two frequencies have been applied to the tape. Normal operation of the over-all system then calls for playback at low speed for monitoring or at high speed for playback and transmission to a second station. For playback at slow speed the switch $S_1$ is opened and a switch $S_3$ is closed, thereby connecting the data track of the head 10 through the 1 kc. impedance-matching network 15 to a data signal amplifier 20. Simultaneously, the switch $S_2$ is opened and the switches $S_4$ and $S_5$ are closed so as to couple the output of the indexing track through a slow playback head impedance-matching circuit 23 to an index playback amplifier 24. The data may then be monitored on any suitable playback equipment.

For transmission to a second station at fast tape speed, i.e., 10 inches per second, the switches $S_1$–$S_5$ are opened and the switches $S_6$ and $S_7$ are closed. The data signals on the data track of the fast-speed magnetic head 11 are then played back and applied to the data amplifier 20 through a 10 k.c. head impedance-matching network and the switch $S_6$. A 10 kc. impedance-matching network is required, since the 1,000 cycle signal played back at 10 inches per second appears as a 10 kc. signal. The output from the data amplifier 20 is then applied to any suitable transmitting apparatus for transmission to the second station at the high tape speed. Simultaneously, the output from the index track will be coupled to the index playback amplifier through a switch $S_7$.

For signal input from a second station at fast speeds, switches $S_8$ and $S_9$ are closed and the remaining switches are opened; and fast-speed Teletype data is applied to the fast-speed data input. Essentially identical apparatus is employed for applying data to the data track of the fast-speed magnetic head 11; however, since the fast tape speed is 10 times that of the slow tape speed, the fast data input signals are used to modulate the output of a 10 kc. oscillator 28 in a modulator 29. The output from the modulator 29 is applied through the switch $S_8$ to the head impedance-matching network 25 and to the data track of the fast-speed magnetic head 11.

Similarly, the output of the 10 kc. oscillator 28 is combined in an adder 31 with the output of the 120-cycle oscillator 17 which is multiplied in frequency by a factor of 10 by means of a multiplier 32. The combined outputs are then applied to the index track of the fast-speed magnetic head through the switch $S_9$.

In view of the fact that two index frequencies are applied to the index track at both high speed and low speed, it will be seen that the index playback amplifier 24 requires only a relatively narrow band in spite of the fact that the equipment is operated at speeds (and hence frequencies) which vary over a relatively wide range. On slow data input operation, this result is accomplished because of the fact that as the speed of the tape increases, the original 120 oscillations will multiply to a maximum of 12,000 cycles at 100 inches per second. Thus, when the frequency of the first indexing signal goes out of the bandwidth of the index playback amplifier 24 due to increased speed, the second indexing frequency is increased to the point where it is well within the detectable bandwidth, thus making the index playback amplifier 24 usable over the entire range of operation of the system. Similarly, on fast data input operation increasing the speed during rewind to 100 inches per second multiplies the 1,200-cycle signal to 12,000 cycles, while slowing down the speeding during playback reduces the frequency to 120 cycles per second. Thus, as before, the required bandwidth need range from only 1,000 cycles to 12,000 cycles per second.

It will be recognized, of course, that the oscillator 17 would preferably be a 100-cycle source in order to make the bandwidth of the index playback amplifier a minimum for the particular operations described. However, 120 cycles is conveniently available from the power line and its use is more economical, and the resultant increase in bandwidth requirements does not impose a heavy burden. It will also be recognized that the frequency multiplier 32 may be omitted and the adder be supplied directly from the source 17, provided the system is capable of handling the increased bandwidth. Also, it will be noted that a source of 1 kc. signal is available at oscillator 12 and may be substituted for the 120-cycle source 17 and multiplier 32 for use during fast data input operations.

For narrowest bandwidth operation, the ratio of the frequency of one index signal to the other index signal must be equal to the square root of the highest playback speed (rewind) to the lowest playback speed (slow speed playback). Algebraically, this may be stated:

$$F_1=F_2\sqrt{\frac{V_1}{V_2}}$$

where $F_1$ is a first index signal frequency, $F_2$ is a second index signal frequency, $V_1$ is the upper limit of playback speed, and $V_2$ is the lower limit of playback speed. Of course, as previously noted, these values may be varied with resultant increase in bandwidth requirements.

The output from the index playback amplifier 24 is applied to a demodulator and low-pass filter 33, the output of which is applied to a Schmidt oscillator 35. The output of the Schmidt is applied to a relay winding 37 which, when energized, maintains a closed circuit to an index lamp indicator 39 through switch $S_{10}$ and switch contact 42. When the winding 37 is deenergized, a circuit is closed to tape-stopping circuits (not illustrated) through switch $S_{10}$ and contact 43.

The demodulator and low-pass filter 33 is provided with an inductance-capacitance network having a time constant sufficient to render the apparatus insensitive to the normal intervals between pulses in the Baudot code. That is to say, the Schmidt circuit 35 will not change state until a predetermined time has elapsed wherein no indexing signal is present and, thus, the switch $S_{10}$ will maintain the indicating lamp lighted until the actual end of a message.

It will be readily observed that many alterations to the illustrated embodiment will be available without departing from the scope of this invention. For example, while the apparatus shown uses an electromagnetic transducer head having both an index track and a data track, the uses of a separate head for each track is considered to be the full equivalent. Moreover, the use of a separate head for recording and playback is also contemplated. Furthermore, the principles of this invention are not limited to magnetic recording, but may be used in any recording system requiring playback of an index or other similar signal over a wide range of speeds.

It is intended, therefore, that this invention be limited only by the appended claims as interpreted in the light of this specification and the prior art.

What is claimed is:

1. In a recording system requiring playback of an index signal applied to a recording medium at a given speed at playback speeds ranging between predetermined upper and lower limits, the combination comprising: a first source of index signals and a second source of index signals, the ratio of frequency of said first source of index signals to said second source of index signals being related to the ratio of said upper limit of playback speed to said lower limit of playback speed; means for algebraically adding said first and second index signals; transducing means for recording said added index signals on said medium at said given speed; and playback means for said index signals, said playback means having a bandwidth sufficient to pass at least one of said index signals over the entire range of playback speeds between said upper and lower limits.

2. The invention as defined in claim 1 wherein said ratio of frequency is expressed by the equation:

$$\frac{F_1}{F_2}=\sqrt{\frac{V_1}{V_2}}$$

where $F_1$ is a first index signal frequency, $F_2$ is a second index signal frequency, $V_1$ is the upper limit of playback speed, and $V_2$ is the lower limit of playback speed.

3. The invention as defined in claim 1 wherein said recording system is a magnetic recording system, and wherein said medium is a magnetic medium.

4. In a recording system in which index signals and data signals are simultaneously applied to a recording medium moving at a given speed, and requiring playback and detection of said index signals at medium speeds ranging between predetermined upper and lower limits, the combination comprising: a source of data signals; transducing means for recording said data signals on said medium; a first source of index signals and a second source of index signals, the ratio of frequency of said first source of index signals to said second source of index signals being related to the ratio of said upper speed limit to said lower speed limit; means for algebraically adding said first and second index signals; transducing means for recording said added index signals to said medium simultaneously and coextensively with said data signals; playback means for said index signals, said playback means having a minimum bandwidth just sufficient to pass at least one of said index signals over the entire range of medium speeds; a detector for detecting said index signals; and means responsive to the presence or absence of detected index signals for controlling an operation of said recording system, said detector including a time delay network rendering said last-named means non-responsive to the absence of index signals for periods of less than a predetermined time.

5. The invention as defined in claim 4 wherein said ratio of frequency is expressed by the equation:

$$\frac{F_1}{F_2}=\sqrt{\frac{V_1}{V_2}}$$

where $F_1$ is a first index signal frequency, $F_2$ is a second index signal frequency, $V_1$ is the upper limit of playback speed, and $V_2$ is the lower limit of playback speed.

6. In a magnetic recording system in which index signals and data signals are simultaneously applied to a magnetic medium moving at a given speed and requiring playback and detection of said index signals at medium speeds ranging between predetermined upper and lower limits, the combination comprising: a source of data signals; magnetic transducing means for recording said data signals on said magnetic medium; a first source of index signals and a second source of index signals, the ratio of frequency of said first source of index signals to said second source of index signals being related to the square root of the ratio of said upper speed limit to said lower speed limit; means for algebraically adding said first and second index signals; magnetic transducing means for recording said added index signals to said magnetic medium simultaneously and co-extensively with said data signals; playback means for said index signals, said playback means having a minimum bandwidth just sufficient to pass at least one of said index signals over the entire range of medium speeds; a detector for detecting said index signals; and means responsive to the presence or absence of detected index signals for controlling an operation of said magnetic recording system, said detector including a time delay network rendering said last-named means non-responsive to the absence of index signals for periods of less than a predetermined time.

7. In a magnetic recording system arranged for recording of signals on a magnetic medium moving at one speed, and for playback of said signals from said medium moving at speeds varying between predetermined upper and lower limits, the combination comprising: a source of data signals; a first source of index signals having a a first frequency; a second source of index signals having a second frequency, the ratio of said second frequency to said first frequency being a function of the ratio of said upper limit to said lower limit; means for algebraically adding said first index signals with said second index signals; first and second recording tracks on said magnetic medium; means for applying said data signals to said first track of said magnetic medium, and means for simultaneously applying said algebraically added index signals to said second track of said magnetic medium while said magnetic medium is moving at said given speed; means for playing back said data signals and means for playing back said index signals while said medium moves at speeds ranging between said upper and lower limits, said last means including an index signal network having a bandwidth just sufficient to pass at least one of said index signals at all speeds within said range; a detector for detecting said indexing signals; and means responsive to the absence of detected index signals for controlling an operation of said magnetic recording system, said detector including a time delay network rendering the last-named means non-responsive to the absence of index signals for periods of less than a predetermined time.

8. In a recording system, the combination comprising: a moving recording medium having first and second parallel recording tracks, said medium moving during playback at speeds ranging between predetermined upper and lower limits, data signals being applied to said first track and index signals being applied to said second track coextensively with said data signals, said index signals including signals of a first frequency and of a second frequency, the ratio of said first frequency to said second frequency being a function of the ratio of said upper limit to said lower limit; transducing means for playing back data signals on said first track; transducing means for playing back index signals on said second track, said transducing means for playing back said index signals including a network having a bandwidth just sufficient to pass at least one of said signals at all speeds of said medium between said upper and lower limits; means responsive to the absence of detected index signals for directly controlling an operation of said recording system; and a time delay network for rendering said last-named means non-responsive to the absence of said detected index signal for periods of less than a predetermined time.

9. The invention as defined in claim 8 wherein said recording system is magnetic and said recording medium is a magnetic tape.

10. In a recording system requiring playback of an index signal applied to a recording medium at a given speed at playback speeds ranging between predetermined upper and lower limits, the combination comprising: a first source of index signals and a second source of index signals, the ratio of frequency of said first source of index signals to said second source of index signals being related to the ratio of said upper limit of playback speed to said lower limit of playback speed; transducing means for recording said index signals of said first source and said second source on said medium at said given speed; and playback means for said index signals, said playback means having a bandwidth sufficient to pass at least one of said index signals over the entire range of playback speeds between said upper and lower limits.

11. In a recording system in which index signals and data signals are simultaneously applied to a recording medium moving at a given speed, and requiring playback and detection of said index signals at medium speeds ranging between predetermined upper and lower limits, the combination comprising: a source of data signals; transducing means for recording said data signals on said medium; a first source of index signals and a second source of index signals, the ratio of frequency of said first source of index signals to said second source of index signals being related to the ratio of said upper speed limit to said lower speed limit; transducing means for recording said index signals of said first and second sources to said medium simultaneously and coextensively with said data signals; playback means for said index signals, said playback means having a minimum bandwidth just sufficient to pass at least one of said index signals over the entire range of medium speeds; a detector for detecting said index signals; and means responsive to the presence or absence of detected index signals for controlling an operation of said recording system, said detector including a time delay network rendering said last-named means non-responsive to the absence of index signals for periods of less than a predetermined time.

References Cited in the file of this patent

UNITED STATES PATENTS

| | | |
|---|---|---|
| 2,839,615 | Sarratt | June 17, 1958 |
| 2,909,337 | Lahti et al. | Oct. 20, 1959 |
| 2,944,248 | Auerbach et al. | July 5, 1960 |